United States Patent [19]

Kritchevsky et al.

[11] Patent Number: 4,471,018
[45] Date of Patent: Sep. 11, 1984

[54] THERMOPLASTIC LAMINATE HAVING MASKED SURFACE FABRIC VEIL LAYER

[75] Inventors: Gina R. Kritchevsky, Scotch Plains; John A. Gregor, Basking Ridge; William F. Wiederspahn, Hackettstown; Margaret M. Randle, Plainfield; Joseph E. Mackey, East Hanover, all of N.J.

[73] Assignee: Allied Corporation, Morris Township, Morris County, N.J.

[21] Appl. No.: 375,239

[22] Filed: May 5, 1982

[51] Int. Cl.³ .............................................. B32B 31/00
[52] U.S. Cl. ..................................... 428/220; 156/199;
156/222; 156/245; 156/251; 156/253; 156/269;
156/270; 156/299; 156/322; 428/246; 428/247;
428/251; 428/252; 428/268; 428/273; 428/284;
428/285; 428/287; 428/474.9; 428/475.8;
428/476.1

[58] Field of Search ............... 428/220, 246, 247, 251,
428/252, 268, 273, 284, 285, 287, 474.9, 475.5,
475.8, 476.1; 156/199, 222, 245, 251, 253, 269,
270, 299, 322

[56] References Cited

U.S. PATENT DOCUMENTS 4,181,551  1/1980  Kritchevsky et al. .............. 156/199
4,240,857 12/1980  Della Vecchia .................... 156/209

FOREIGN PATENT DOCUMENTS 837044  3/1970  Canada ................................ 154/140

Primary Examiner—Marion E. McCamish
Attorney, Agent, or Firm—Richard A. Negin; Patrick L. Henry; Richard A. Anderson

[57] ABSTRACT

An improved polymer sheet. The improvement is at least one surface polymer film layer and at least one fabric veil. A veil is laminated between each surface polymer film layer and the polymer sheet. There is a method of heating a polymer sheet containing the improvement of the present invention.

19 Claims, 2 Drawing Figures

THERMOPLASTIC LAMINATE HAVING MASKED SURFACE FABRIC VEIL LAYER

BACKGROUND OF THE INVENTION

This invention relates to a polymer sheet having a surface fabric veil layer masked by a surface polymer film layer; and a method of heating such a laminate.

Thermoplastic laminates comprising a polymer and a reinforcement means are known in the art. Such known laminates and methods of their preparation are disclosed in many patents and publications. Examples of reinforced thermoplastic laminates are disclosed in U.S. Pat. Nos.: 4,302,269; 4,291,084; 4,269,884; 4,255,219; 4,238,266; 4,240,857; 4,098,943; 4,044,188; 3,745,140; 3,833,453; 3,765,998; 3,850,723; 3,318,757; 3,531,369. These patents are a nonlimiting illustration of the state of the art of reinforced thermoplastic laminates and are incorporated by reference.

Thermoplastic reinforced laminates known in the art are either shaped into articles of manufacture immediately upon being laminated, or are put into some blank form. The thermoplastic laminate blank is later reheated and formed into the desired shape. A problem which has been encountered during the reheating of thermoplastic blanks is that the thermoplastic material becomes soft and sticky. The surface adheres to supporting means in the means to heat the laminate blank causing the laminate blank to deform while being removed from the supporting means. One solution to this problem is to place a thin fiberglass fabric veil on the surface of the laminate. This veil is located between the laminate and the laminate support in the heating means. The thin fiber glass veil can be laminated to the surface of the laminate during lamination. U.S. Pat No. 4,238,266 discloses the use of a surface fiberglass veil layer and its advantages. This veil prevents the heated laminate from adhering to the laminate support surface. Such laminate support surfaces are usually oven shelves, or conveyor belt surfaces either solid or foraminous. The difficulty in removing the heated laminate results not only in a disruption of the laminate surface where it adheres to the laminate support but also results in distortion of the laminate as the laminate is attempted to be removed from the laminate support. Additionally the surface veil prevents the laminate from sagging after it has been heated. The use of this type of veil is generally detrimental to smooth surface appearance and results in the veil being only partially impregnated into the surface of the laminate. Not only is the surface appearance somewhat deteriorated, but when the veil is made of glass it results in a scratchy surface with exposed fiberglass which easily breaks off and is difficult to handle.

It is known in the art to use surface mats such as those disclosed in U.S. Pat. Nos. 3,850,723; 3,713,962 and 3,664,909. The use of an embedded surface layer is also disclosed in GB No. 1341438 and Canadian Pat. No. 837,044. When a light weight fabric such as that disclosed in Great Britain Pat. No. 1341438 is embedded in the surface, a small amount of the fibers protrude and can cause scratching of the skin during handling. Canadian Pat. No. 837,044 discloses a laminate containing a fabric reinforcing layer having a thin outer thermoplastic sheet. However, Canadian Pat. No. 837,044 does not disclose the use of a surface thermoplastic layer with a thin fabric veil which permits preheating the laminate without the laminate adhering to the laminate support of the heating means.

It is known in the art to use thin surface layers of polymeric material to improve the surface appearance of laminates. This is particularly illustrated in GB No. 1547280.

SUMMARY OF THE INVENTION

Figure 1:
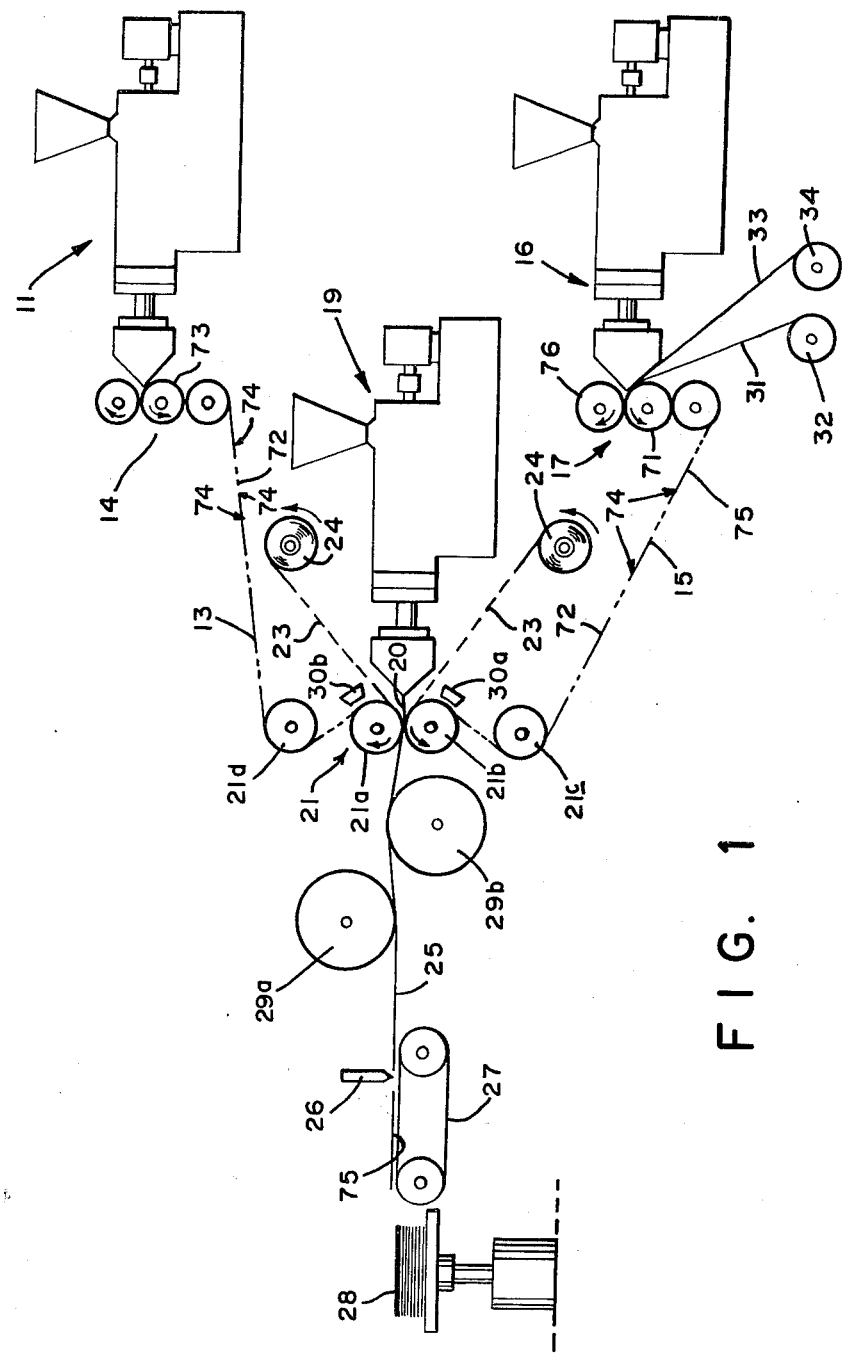
FIG. 1 is a schematic drawing of a system for producing polymer laminates containing a fiberglass veil and a surface polymer layer.

The present invention is an improved polymer sheet. The term polymer sheet includes single layer polymer sheets and laminates, including a laminate of the type having a laminate body comprising a polymer and a reinforcement means. The improvement is at least one surface polymer film layer and a fabric veil, preferably a fiberglass fabric veil laminated between each surface polymer film layer and the surface of the polymer sheet or laminate body. The surface polymer film layer is from 0.1 to 10 mils in thickness, and preferably 0.25 to 2 mils in thickness.

The present invention also includes a method of heating a polymer sheet, preferably a laminate of the type having a laminate body comprising a polymer and a reinforcement means. The heating means has a heating means support. At least one fabric veil layer is laminated to the surface of the polymer sheet. There is at least one surface polymer layer from 0.1 to 10 mils in thickness, and preferably 0.25 to 2 mils in thickness, laminated to the fabric veil layer. The polymer sheet is placed on the heating means support of the heating means with the surface polymer film layer of contact with the heating means support. The polymer sheet is heated and removed from the heating means support. Using this method it has been found that the polymer sheet does not adhere to the heating means support upon being heated in the heating means. The surface of the polymer sheet on which the fabric veil and polymer film layer are applied is smooth without fibers from the fabric veil protruding therefrom. The surface has excellent appearance and can easily be handled.

DESCRIPTION OF THE PREFERRED EMBODIMENT

The present invention is an improved polymer sheet, and method of heating a polymer sheet. The term polymer sheet includes single layer polymer sheets and laminates. The single layer sheets can optionally contain fillers and/or reinforcement. The preferred polymer sheet of the present invention is a laminate having a laminate body comprising a polymer and a reinforcing means. The laminate body can be a polymer laminate as known in the art and includes those described in the Background of the Invention. The laminate reinforcement means can be a fabric layer embedded in the polymer or laminated with the polymer. Alternately, the reinforcement means can be a fiberous or particulate material blended or mixed in a polymer layer. The improved polymer sheet of the present invention includes and is preferably a polymer laminate having a laminate body comprising such a polymer and reinforcement means. The improvement is at least one surface polymer film layer, from 0.1 to 10 mils in thickness and preferably 0.25 to 2 mils in thickness, and a fabric veil laminated between each surface polymer film layer and the laminate body.

The fabric veil is from 0.1 to 5 ounces per square yard, preferably 0.5 to 3 ounces per square yard of fine fibers. The fibers can have an average diameter of from about 5 to about 25 micrometers, preferably 7 to 20 micrometers. The fiberous veil can be either woven or nonwoven fibers, with nonwoven fibers preferable. The fabric veil useful in the present invention can be made from a wide variety of fibers having a melting point higher than the polymer in the polymer sheet and the surface film layer polymer. Fibers suitable for use in the fabric veil include fiberglass, asbestos, carbon, graphite, boron, cellulose, titanates, polyesters, polyamides, polyaramids, polyacrylics, metallics, amorphous metals such as those sold under the tradename of MET-GLAS ®, by Allied Corporation and mixtures thereof. The preferred material for use in the fabric layer of the laminate of the present invention is fiberglass.

The surface polymer film layer can be made of any polymer which will adhere to the polymer sheet. Preferably, the surface polymer film layer is a thermoplastic polymer. The surface polymer layer is from 0.1 to 20 mils, preferably from 0.1 to 10 mils, more preferably from 0.2 to 5 mils, yet more preferably from 0.25 to 3 mils, and most preferably about 0.25 to 2 mils thick. The surface polymer film layer should be thick enough to coat and/or embed the fabric veil yet not be too thick to prevent the effects of the fabric veil in preventing the polymer sheet from sticking to the heating means support in the heating means when the polymer sheet is heated or reheated.

The thermoplastic polymers which can be used as surface polymer film layer polymers in laminates of the present invention and in accordance with the methods of the present invention include the various thermoplastic materials normally used in injection molding, extrusion, vacuum forming, blow molding, fiber spinning, or similar thermoplastic processing techniques. The surface polymer can be the same or different from the polymer in the laminate body. The surface polymer should be compatible with and adhere to the polymer in the polymer sheet, or laminate body.

Particularly desirable thermoplastics for the surface polymer film layer compositions are the polyamides, that is, polymers having regularly recurring amide groups as an integral part of the main groups as an integral part of the main chain. Polyamides such as nylon 6,6 (a condensation product of hexamethylene diamine and adipic acid) and nylon 6 (the polymerization product of epsilonaminocaproic acid or caprolactam) are examples of two polyamides or nylons.

Polyolefins may also be employed, including polymers and copolymers of ethylene, propylene, methylpentene and blends thereof. Other polymers which can be utilized include polyurethane, polysulfone, polycarbonate and linear polyesters such as polyethylene terephthalate and polybutlyene terephthalate; cellulose esters such as cellulose acetate, and cellulose propionate; halogenated polyolefins and polyacetals.

Additional thermoplastic resinous materials which may be utilized in making the surface polymer film layer of the invention include, the alkenyl aromatic resins typified by polystyrene, styrene copolymers, blends and graft copolymers the alkenyl aromatic resins typified by polystyrene copolymers, blends and graft copolymer of styrene and rubber and the like. The invention may be practiced utilizing polyvinyl chloride or copolymers of vinyl chloride or vinylidene chloride.

Also included in the term polymer are blends or copolymers of two or more polymeric materials. Illustrative of such polymers are polyethylene/polypropylene, ethylene-acrylic acid-vinylacetate terpolymers and the like.

The present invention includes a method of heating a polymer sheet, preferably of the type having a laminate body comprising a polymer and a reinforcement means as described above and discussed in the Background of the Invention. The method of the present invention is directed to heating the laminate in a heating means having a heating means support. Typically these heating means are ovens having shelves on which the polymer sheet is supported. The heating means can be ovens through which conveyor belts convey the laminates. The polymer sheets are supported on the conveyor belts. The conveyor belts can have solid or formainous surfaces. A typical foraminous belt used to convey polymer sheets is a chain link type metal conveyor belt. A typical solid conveyor belt is made of a fluoropolymer.

A fabric veil layer is laminated to at least one surface of the polymer sheet. There is at least one surface polymer film layer laminated to the surface of each fabric veil layer. The laminate thus formed is placed on the heating means support within the heating means with the surface polymer film layer in contact with the laminate support. The polymer sheet is heated, and removed from the heating means support. It is recognized that the improved polymer sheet of the present invention can be cooled after lamination and reheated or preheated for subsequent processing, such as stamping.

Using the method of the present invention the polymer sheet can easily be removed from an oven heating surface without adhering to the heating means support. The surface of the polymer sheet which was in contact with the heating means support in the heating means has good surface appearance and does not have fibers from the fabric veil protruding through the surface to cause a dull and porous surface appearance. Veils made of brittle fabrics such as fiberglass do not result in handling difficulties, or abrasion of the fibers.

Figure 2:
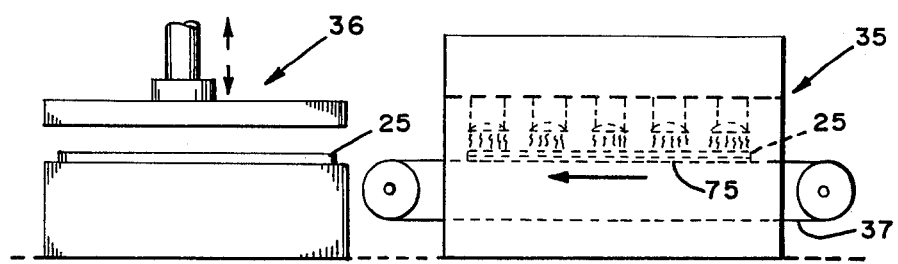
FIG. 2 is a schematic drawing of laminates of the present invention being preheated in an oven and placed in a stamping press.

Reference is made to FIGS. 1 and 2 which illustrate a preferred polymer sheet including the improvement of the present invention, and a preferred method of the present invention. A preferred polymer sheet is a laminate body comprising a body portion, which is preferably a reinforced layer comprised of a long glass mat embedded in a thermoplastic matrix, laminated to at least one surface portion, which is preferably a polymeric surface sheet layer which can optionally contain particulate and/or fibrous filler. The preferred laminate body polymer and surface polymer film layer is polycaprolactam. Processing conditions in the description that follows are made considering the polymer to be polycaprolactam. The laminate body is made by a process described in U.S. Pat. No. 4,240,857, hereby incorporated by reference. The body portion is at least one long fiberglass nonwoven mat embedded in a polycaprolactam matrix and the surface portion is a surface sheet of polycaprolactam containing a filler.

A mixture of thermoplastic resin such as polycaprolactam, short glass and particulate filler and is extruded same through the die of extruder 16. The extruder is heated to from 550° F. to 750° F., preferably 550° F. to 650° F. and most preferably from 560° F. to 600° F. The extrudate passes from the die to the nip of rolls 71 and 76 of roller stack 17. The rolls are heated to at least 280° F. to 400° F. and most preferably 290° F. to 350° F. Roll 71 optionally has an engraved pattern or roughened surface. Roll 76 is preferably embossed. A polymer film 31 such as a polyepsiloncaprolactam film is fed from polymer film roll 32 onto roll 71 to the nip of rolls 71 and 76. A fiber veil 33 such as a fiberglass veil is fed from fiber roll 34 on to the polymer film 31 on roll 71. The layer of polymer film 31 and fiber veil 33, with the polymer film 31 located between roll 71 and fiber veil 33 pass to the nip of rolls 71 and 76. The extrudate passes to the nip of rolls 71 and 76, with the fiber veil between the polymer film and the extrudate. The polymer film and fiberglass veil are at room temperature. A sheet 15 is produced which is embossed by roller 71 of stack 17 so as to form an embossed surface 72 thereon containing a plurality of projections 74. Sheet 15 has the fiber veil 33 laminated between the polymer extrudate and the polymer film 31 on surface 75 opposite the side containing projections 74. Sheet 15 becomes a surface portion of the laminate.

The extruder and rolls immediately after the die of the extruder, are heated to higher temperatures when a fiberglass veil and surface polymer film layer are used than when they are not used. Generally, the extruder is heated to 40-80° F., preferably 50-70° F. hotter and the rolls are 20-60° F., preferably 30-50° F. hotter when using a surface film and fiberglass veil on the outer layer than when they are not used. When using a polymer sheet which is a laminate having a surface portion corresponding to sheet 15, and the fabric veil and polymer surface film layer are to be laminated as part of the surface portion, the polymeric composition of the surface portion is heated to from 550° F. and 750° F. prior to lamination with the fabric veil and polymer film layer. This assures that there is sufficient heat in the surface portion for the polymer film layer to melt and the surface portion forms a coherent laminate which will not delaminate.

A similar thermoplastic sheet 13 is a surface portion produced from extruder 11 and embossed in similar fashion as sheet 15 by roller 73 of stack 14. In the FIG. 1 sheet 13 does not contain a fiber veil and polymer film layer. Extruder 11 is heated to from 500° F. to 750° F., preferably 520° F. to 650° F., and most preferably 520° F. to 560° F. The roll stack 14 temperature is at least 250° F., preferably from 250° F. to 400° F. and most preferably 250° F. to 280° F. This sheet 13 can optionally have a layer of fiber veil and outer layer of polymer film in the manner of sheet 15. Processing conditions must be modified accordingly.

The body portion of the laminate is a layer of fiberglass mat embedded in thermoplastic. A third extruder 19 feeds a thermoplastic sheet 20 into laminating rolls 21 simultaneously with sheets 13 and 15, and long glass mat or mats 23 which are fed from roll or rolls 24. Sheet 20 should be in a molten condition at the point where the sheets converge on the rolls 21 and sheets 13 and 15 are preferably below the melting point of the polymer so that projections 74 position the glass mat or mats 23 within the molten sheet 20 during impregnation of the mat(s) 23 by the sheet 20. Extruder 19 is heated to 550° F. to 750° F., preferably 550° F. to 650° F. and most preferably 560° F. to 575° F. The roll stack 21 is heated to at least 280° F., preferably 280° F. to 400° F., and most preferably 280° F. to 350° F. Roll temperatures depend on and vary with line speed. In this manner, the long glass reinforcing mat becomes substantially encased in the sheet 20 and does not affect surface qualities of sheets 13 and 15 when they are laminated together. The sheet is subsequently cut with cutter mechanism 26 on conveyor 27 and fed to stacking table 28.

The clearance between rolls 21(a) and 21(b) is less than the combined thickness of thr four components 13, 15, 20 and 23. (Thickness of mat 23 is measured under little or no compression.) This causes impregnation of mat 23 by sheet 20, and lamination of the resulting product to sheets 13 and 15.

The temperature of the sheet 20 is preferably above (at least 10° C. above) the thermoplastic melting point to provide adequate residual heat to allow for cooling of sheet 20 between the extruder die 30 and the roll stack 21 and allow the glass mat to be uniformly impregnated thereby. Preferably, the sheet is 50° C. to 100° C. above the polymer melting point at the point of convergence between rolls 21(a) and 21(b). Heating the sheet to a temperature higher than 350° C. in the extruder may cause degradation of the polymer and results in excessive energy consumption. Lower temperatures result in inadequate impregnation of the mat 23 by sheet 20, including inadequate flow of the polymer into the interstices of the glass mat, inadequate bonding of sheets 13 and 15 to sheet 20, and inadequate binding of the fibers to the polymer resulting in poor physical properties in the final product.

For the same reasons, the pressure applied by rolls 21(a) and 21(b) should range from 100 to 1500 pounds per linear inch, and preferably from 150 to 400 pounds per linear inch, to ensure adequate bonding of the layers and impregnation of the glass mat 23 by sheet 20. Rolls 21(a) and 21(b) must have adequate diameter and wall thickness and bearings of sufficient load bearing capacity to prevent excessive deflection of rolls 21(a) and 21(b). Excessive deflection of rolls 21(a) and 21(b), that is deflection of the order of about 3 thousandths inch or more, can result in non-uniform impregnation of glass mat 23 by sheet 20, non-uniform bonding of sheets 13 and 15 to sheet 20, non-uniform surface appearance, and non-uniform thickness of sheet 25.

Sheet 13, after leaving embossing stack 14, contacts roll 21(d) and then roll 21(a). Sheet 15, after leaving embossing stack 17, contacts roll 21(c) and then roll 21(b). Rolls 21(c) and 21(d) are maintained at a temperature close to but below the polymer melting point, preferably 5° C. to 40° C. below the polymer melting point. Rolls 21(a) and 21(b) are maintained at a temperature 10° C. to 70° C. below the polymer melting point. The temperatures of rolls 21(a), 21(b), 21(c) and 21(d) and infrared heaters 30(a), 30(b) are adjusted so that the temperature of sheets 13 and 15 is high enough to achieve strong bonding of sheets 13 and 15 to sheet 20, but not so high as to result in sticking of sheet 13 to roll 21(d) or 21(c) or of sheet 15 to roll 21(a) or 21(b), softening of projections 74 or degradation of the surface quality of sheet 25.

Cooling rolls, such as rolls 29(a) and 29(b), can be used to quickly lower the temperature of laminate 25 sufficiently for easy cutting on cutter mechanism 26.

FIG. 2 illustrates preheating a laminated sheet 25 in oven 35. The sheet 25 is placed on the surface of conveyor 37 with side 75 of sheet 25 contacting the conveyor. Upon completion of preheating, sheet 25 is easily removed from conveyor 37 without deformation. The sheet can be removed manually or automatically. Manual removal can be merely picking the sheet up by hand or using a spatula like tool. The sheet can be formed in a stamping press 36. Upon being stamped, the side of the stamped article corresponding to sheet side 75 is smooth with good appearance. There are no protrusions of fiber from the veil 33 through the polymer film 31 to cause a rough appearance or discomfort upon handling.

As discussed in the patents referenced in the Background of the Invention, the polymer sheet can be made of a polymer and a reinforcement means. The reinforcement means may be one or more fabric layers which are laminated with polymers or embedded within polymers. The fibers in the laminate body can be in the form of filaments, threads, yarns, rovings, chopped fiber, scrim, swirl mat, woven rovings, cloth and the like. The preferred fibrous reinforcements are mineral fibers such as glass fiber. Glass fiber provides optimum strength characteristics and is readily available in many forms.

Fibrous swirl mats used as reinforcement in the laminate or in the fabric veil are usually used in an impregnated form. These impregnated fabrics are generally treated with a resin solution to both bind the fibers and wet the fibers. The resinous plastic used to impregnate or coat the fabric or fibers used in the laminate body or fabric veil of the present invention can include both thermosetting and thermoplastic resins. Illustrative of the thermosetting resins are: crosslinked or crosslinkable epoxy resins, polyester resins, polyurethane resins, olefin polymers, phenolic resins and the like. Illustrative of thermoplastic resins are uncrosslinked olefins such as ethylene polymers, propylene polymers, butene polymers and vinyl polymers. Intended to be included with this definition are both the homopolymer and copolymer resins.

The polymer of the polymer sheet as well as the polymer used in the surface layer can include a variety of additives, including fillers and other minor additives.

While composites without filler may be formed, the most desirable sheets include filler. The functions of the particulate filler are: (1) to increase the modulus and stiffness of the composite sheet and (2) to provide a more economical composition.

Fillers may be selected from a wide variety of minerals, metals, metal oxides, siliceous materials, metal salts, and mixtures thereof. These fillers may optionally be treated with various coupling agents or adhesion promoters, as is known to those skilled in the art. Advantageous physical properties are achieved if the filler material has a Young's modulus of $10^7$ psi or greater and at least a Young's modulus twice as great as that of the polymer. Examples of fillers included in these categories are alumina, aluminum hydrates, feldspar, asbestos, talc, calcium carbonates, clay, carbon black, quartz, novaculite and other forms of silica, kaolinite, bentonite, garnet, mica, saponite, beidellite, calcium oxide, calcium hydroxide, wollastonite, etc. The foregoing recited fillers are illustrative only and are not meant to limit the scope of fillers that can be utilized in this invention.

Other minor additives which may be of value in sheet formulations include antistatic agents, plasticizers, lubricants, nucleating agents, impact modifiers, colorants, heat and light stabilizers, or other similar processing aids and adjuvants.

Pigments such as carbon black are useful to hide the fiber veil which is immediately below the polymer film.

With sheets formed of polycaprolactam (nylon 6), it is preferred to utilize a nucleating agent for the nylon. Talc is the preferred nucleating agent. For this purpose about 0.5 percent to 1.5 percent or more talc by weight of the nylon is incorporated into the sheet. Preferably, the sheet contains about 1 percent talc based on the weight of the nylon. Talc or other nucleating agents may alternatively be employed in similar amounts with nylon or other crystalline polymers.

Each of the foregoing constituents performs a specific function within the composite material. The thermoplastic resin is, of course, the matrix which binds the other constituents together. As the matrix, the resin influences the mechanical and physical properties of the composite sheet. If a stamped product having an extremely high thermal resistance is required, for example, a nylon or linear polyester would be utilized as the matrix rather than polyethylene or polypropylene.

An example is set forth below to illustrate the nature of the invention and the manner of carrying it out. However, the invention should not be considered as being limited to the details thereof.

EXAMPLE

A laminate was made using the equipment and process of the type illustrated in FIG. 1 and described in the corresponding description in the Description of the Preferred Embodiments. Reference characters correspond to those in FIG. 1. Infrared heaters (30) were not used. The line speed was about 1½ feet/minute. A top layer 13, or surface portion, of polycaprolactam containing 30 percent by weight short glass fibers (less than ⅛ inch long), 19 percent glass microspheres about 12 microns in diameter, and one percent talc was extruded through a single screw extruder (11) at an average temperature about 520° F. The top layer is extruded through a die set at about 0.1 inches. This is drawn down to about 0.06 inches in roll stack 14. The extrudate passed between two rolls (14), one of which was embossed (72). The rolls are heated to about 250° F. A bottom layer (15), or bottom surface portion, similar to the top layer was extruded at about 580° F. A surface polymer film and a glass veil at room temperature were fed to the nip of the two rolls (17) at the outlet of the die. The rolls are heated to about 290° F. The veil was between the extrudate layer and the surface polymer film layer. The fiberglass veil and polymer surface film layer were fed to the side of the extrudate opposite to the side which was embossed by the embossing roll (76).

The top layer (13) and the bottom layer (15) passed to the nip of a third set of rolls (21) with their embossed sides facing each other. The rolls (21) are heated to about 290° F. Polycaprolactam containing about 29 percent by weight of glass microshperes about 12 microns in diameter, and about one percent talc was extruded through a single screw extruder (19) at an average temperature of about 560° F. Long fiberglass mats and the extrudate which passed from the die of extruder (19) were fed to the nip of rolls 21a and 21b. The long fiberglass mat is nonwoven glass and 3.63 oz/ft². The long fiberglass mat embedded into the extrudate from extruder 19 to form the body portion of the laminate. The surface sheets (13) and (15) were laminated to the opposite sides of the body portion. The laminate was cooled to room temperature.

The laminate passed from rolls (21) through cooling rolls (29) at room temperature and was cut into sheets. The buried veil was made of 0.2 oz/ft² continuous, nonwoven fiberglass. The polymer surface film was made of heat stabilized polycaprolactam. 10 Laminates were made using polymer surface films of 0.6, 1.0, 1.5 mils.

The laminates at room temperature were placed in an oven and were heated on a steel oven shelf for 2 minutes at 600° F. The laminates were easily removed from the oven shelf manually. There was no adhesion to the oven shelf nor distortion of the laminates upon removal. Surface appearance was good, and the surface could be touched without feeling protruding fibers.

While exemplary embodiments of the invention have been described, the true scope of the invention is to be determined from the following claims.

What is claimed is:

1. An improved polymer sheet wherein the improvement comprises:
   at least one surface polymer film layer being from 0.1 to 10 mils in thickness, and a fabric veil laminated between each surface polymer film layer and the polymer sheet.

2. The improved polymer sheet as recited in claim 1 wherein the surface polymer film layer is from 0.25 to 2 mils in thickness.

3. An improved laminate of the type having a laminate body comprising a polymer and a reinforcement means wherein the improvement comprises:
   at least one surface polymer film layer being from 0.1 to 10 mils in thickness, and a fabric veil laminated between each surface polymer film layer and the laminate body.

4. The improved laminate as recited in claimn 3 wherein the polymer of the laminate is a polyamide.

5. The improved laminate as recited in claims 3 or 4 wherein the surface polymer film layer is a polyamide.

6. The improved laminate as recited in claims 3 or 4 wherein the surface polymer layer and the polymer of the laminte body are both polycaprolactam.

7. The improved polymer sheet as recited in claim 3 wherein the surface polymer film layer is from 0.25 to 2 mils in thickness.

8. A method of heating a polymer sheet in a heating means having a heating means support, comprising the steps of:
   laminating at least one fabric veil layer to the surface of the polymer sheet;
   laminating at least one surface polymer film layer to the fabric veil layer, the surface polymer film layer being from 0.1 to 10 mils in thickness;
   placing the polymer sheet on the heating means support, with the surface polymer film layer in contact with the heating means support;
   heating the polymer sheet;
   removing the polymer sheet from the heating means support, wherein the laminate does not adhere to the heating means support.

9. The method as recited in claim 8 wherein the polymer sheet is a laminate of the type having a laminate body comprising a polymer and a reinforcement means.

10. The method as recited in claim 9 wherein the polymer of the laminate body and the polymer of the surface polymer film layer is a polyamide.

11. The method as recited in claim 10 wherein the polyamide is polycaprolactam.

12. The method as recited in claim 10 wherein the laminate body further comprises a surface portion and a body portion, and wherein the step of laminating the fabric veil and the surface polymer film layer to the laminate body further comprises heating the surface portion of the laminate body which will contact the fabric veil to from 550° F. to 750° F., laminating the fabric veil between the surface polymer film layer and the heated surface portion of the laminate body.

13. The method as recited in claim 12 wherein the surface portion of the laminate body is a separate surface sheet, and the steps of laminating the fabric veil to the surface sheet and the surface polymer film to the fabric veil further comprises the steps of: feeding the heated surface sheet to the nip of two laminating rolls; feeding the polymer surface film to the nip of the laminating rolls; feeding the fabric veil to the nip of the laminating rolls between the polymer sheet and the polymer surface film; and heating the rolls to from 290° F. to 400° F.

14. The method as recited in claim 13 further comprising heating the surface sheet to from 560° F. to 600° F. and heating the laminating rolls to from 290° F. to 350° F.

15. The method as recited in claim 14 further comprising the step of laminating the surface sheet to the laminate body, with the polymer film surface layer at the surface of the laminate body.

16. The method as recited in claim 15 wherein the step of laminating the surface sheet to the laminate body further comprises the steps of: heating the body portion to from 550° F. to 750° F.; feeding the laminate body portion to the nip of the laminate rolls; feeding the surface sheet to the nip of a stack of laminate rolls with the polymer surface film facing away from the laminate portion; and heating the laminate rolls to from 280° F. to 400° F.

17. The method as recited in claim 16 wherein the body portion is heated to from 560° F. to 575° F., and the laminating rolls are heated to from 280° F. to 350° F.

18. The method as recited in claim 13 wherein the surface sheet is heated to at least 40–80° F. higher than necessary and the rolls are heated to 20–60° F. higher than necessary, to form a laminate body of the surface portion and body portion, than if the fabric veil and surface polymer film and the rolls are not laminated to the surface portion.

19. The method as recited in claim 10 wherein the laminate body further comprises a surface portion and a body portion and wherein the step of laminating the fabric veil and the surface polymer film layer to the laminate body further comprises heating the surface portion to at least 40–80° F. higher than necessary to form a laminate of the surface portion and body portion if the fabric veil and surface polymer film are not laminated to the surface portion.

* * * * *